March 6, 1951      H. DUNN      2,544,143
LEVEL WIND MECHANISM
Filed June 19, 1947
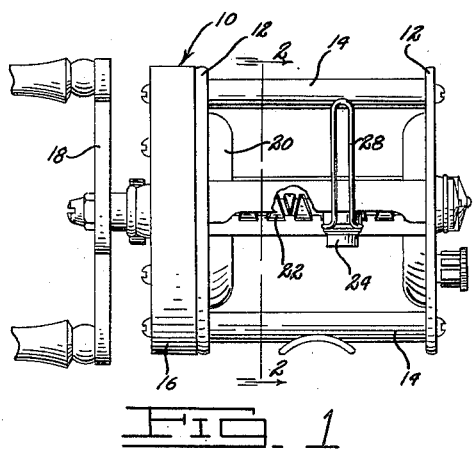
INVENTOR.
HENRY DUNN
ATTORNEY Patented Mar. 6, 1951

2,544,143

UNITED STATES PATENT OFFICE 2,544,143

LEVEL-WIND MECHANISM

Henry Dunn, Detroit, Mich.

Application June 19, 1947, Serial No. 755,669

2 Claims. (Cl. 242—84.4)

This invention relates to a guide for directing a line longitudinally along the axis of a reel during the winding of the line on the reel often referred to as a "level-wind" device. More particularly, the invention relates to a level-wind device for a fish line reel commonly used in trolling or casting.

While the level-wind devices are now in common use, they have been expensive to manufacture, particularly so where great accuracy is required as in fishing reels.

An important object of the present invention is to provide a device which is inexpensive to manufacture and yet one which is extremely accurate in its operation.

A further object of the invention is to construct the device in such a manner that the component parts are easily assembled on the reel thus eliminating excessive cost of manufacture.

Other objects and advantages of the invention will more appear from the following description taken in connection with the accompanying drawings in which:

Fig. 1 is a side elevational view of a fishing reel, showing the improved level-wind device applied thereto;

Fig. 2 is a sectional view taken on line 2—2 of Fig. 1 showing the level-wind device in side elevation;

Fig. 3 is an enlarged sectional view through the level-wind device and the lead screw to which the device is applied;

Fig. 4 is a perspective view of the screw thread engaging plunger;

Fig. 5 is a fragmentary view illustrating a modified form of the invention; and

Fig. 6 is a view corresponding to Fig. 5 illustrating a further modification.

Referring to the drawings, the invention has been shown as applied to a fishing reel 10. The reel is of the usual design having opposite end plates 12 carried by spacers 14. A casing 16 secured to one of the plates 12, encloses the usual gear reduction mechanism and a crank 18 serves as a manually driving means for rotating the reel spool 20 and lead screw 22, through the gear reduction mechanism.

The lead screw 22 has its outer periphery provided with intersecting left and right hand screw threads for directing a level-wind device across the reel, longitudinally thereof, alternately in opposite directions.

The main body portion of the level-wind device comprises a sleeve 24, thread engaging plunger 26, line guide loop 28, and plunger retainer spring 30.

The sleeve 24 is machined from bar stock and has a dome shaped head portion 32 and a tubular portion 34. The outer periphery of the tubular portion is provided with an annular groove 36. The sleeve 24 has a transversely extending bore 38 through the head portion 32 and a longitudinally extending bore 40 from the outer end of the tubular portion 34 intersecting the periphery of the bore 38 so that there is provided a T-shaped opening terminating in opposite sides of the sleeve and the outer end of the tubular portion 34.

The lead screw 22 is adapted to slidingly fit within the transversely extending bore 38 for movement across the reel 10, parallel to the axis of the spool 20.

The screw thread engaging plunger 26 is maclined from annular rod stock and cut to the required length. The one end of the plunger is flat as at 42 and its opposite end is provided with a longitudinally extending rib 44 having an arcuate groove cut therein between its opposite ends. The arcuate groove has a radius corresponding substantially to the radius of the root diameter of the screw threads in the lead screw 22. The plunger 26 is rotatably and slidably received in the bore 40 with the rib 44 projecting toward the lead screw 22 and having its arcuate end in engagement with the threads formed thereon.

An annular groove 48 is formed in the inner periphery of the bore 40, adjacent its outer end and receives a split spring ring 30 for retaining the plunger 26 in assembled position.

The line guide loop 28 is preferably formed of a strip of wire stock reversely bent at its center into the form of a "hairpin" with the free ends thereof bent toward each other to form a split loop which surround the tubular portion 34 and are tightly bent into the annular groove 36. At spaced intervals, the outer edges of the material around the groove 36 are "staked" as at 50 to securely hold the ends of the guide loop within the groove 36 and to prevent slipping of the loop relative to the sleeve 24.

In the manufacture and assembly of the device, the sleeve 24 is turned from bar stock on an automatic machine, cut to length, and the bores 38 and 40 are machined in the sleeve. The sleeve is placed over the lead screw, the plunger is inserted in the bore 40, and the spring ring 30 snapped into place.

As shown in Fig. 5, the plunger 26' may be held in operative position by a spring cap 52 having a closed end 54 and a plurality of spring fingers 56 adapted to fit over the outer periphery of the tubular portion 34' with the depressed ends 58 engaging an annular groove 60 in the outer periphery of the tubular portion 34'.

In Fig. 6 I have illustrated the bore 40' as being provided with screw threads at 62 for receiving a screw threaded plug 64 for retaining the plunger 26' in operative position.

While the invention has been illustrated and described in its preferred form, it will be understood that various changes including the size, shape and arrangement of parts may be made without departing from the spirit of my invention and it is not my intention to limit its scope other than by the terms of the appended claims.

I claim:

1. A level-wind device comprising an annular sleeve having a transversely extending bore therethrough for a sliding fit over a lead screw having intersecting left and right hand threads, a plunger rotatably mounted in said sleeve and slidable toward and away from the axis of the transversely extending bore, means on said plunger for engagement with the threads of the lead screw, retaining means for holding said plunger in screw thread engagement with the lead screw, said sleeve having a channel around its outer periphery, a looped guide wire carried in said channel, and the edges of said channel peened over said wire guide.

2. A level-wind device comprising a lead screw having intersecting right and left hand threads, a sleeve carried by said lead screw, an actuating member for engagement with the threads of said lead screw, a channel around the outer periphery of said sleeve, and a looped guide wire carried by said channel, the edges of said channel peened over said guide wire.

HENRY DUNN.

REFERENCES CITED

The following references are of record in the file of this patent:

UNITED STATES PATENTS

| Number | Name | Date |
|---|---|---|
| 1,819,724 | Broadwell et al. | Aug. 18, 1931 |
| 1,960,286 | Russell et al. | May 29, 1934 |